United States Patent [19]

O'Scanlon

[11] Patent Number: 5,273,607
[45] Date of Patent: Dec. 28, 1993

[54] PROCESS FOR MANUFACTURING AN HERALDIC ESCUTCHEON

[76] Inventor: John B. O'Scanlon, 417 Los Verdes Dr., Santa Barbara, Calif. 93111

[21] Appl. No.: 831,932

[22] Filed: Feb. 6, 1992

[51] Int. Cl.⁵ .................. B32B 31/00; A63H 33/30; F41H 5/08
[52] U.S. Cl. ...................... 156/277; 283/81; 283/117; 40/594; 89/36.05; 446/473; 156/249
[58] Field of Search .............. 283/81, 117; 40/324, 40/594, 586; 156/277, 249; 446/88, 313, 473; 89/36.01, 36.02, 36.05; 2/17

[56] References Cited

U.S. PATENT DOCUMENTS

| | | | |
|---|---|---|---|
| 2,820,318 | 1/1958 | Guyer | 446/473 |
| 2,939,242 | 6/1960 | Papadakis | 446/88 |
| 3,970,313 | 7/1976 | Montemayor | 273/134 AD |
| 4,687,526 | 8/1987 | Wilfert | 156/277 |
| 5,056,155 | 10/1991 | Truxell | 89/36.05 X |
| 5,133,024 | 7/1992 | Froessl | 382/41 |
| 5,191,406 | 3/1993 | Brandestini | 358/22 |

*Primary Examiner*—David A. Simmons
*Assistant Examiner*—Chester T. Barry
*Attorney, Agent, or Firm*—Kelly, Bauersfeld & Lowry

[57] ABSTRACT

A personalized heraldic shield is constructed by accessing a computer which stores and assembles heraldic emblems and figures into a coat-of-arms, inputting a selected family name, retrieving and transferring the coat-of-arms corresponding to the family name to a printer, printing the coat-of-arms onto an adhesive backed substrate, and adhering the substrate to a base. A cover is then adhered over the substrate-bearing coat-of-arms, and edging is applied around the perimeter of the shield. The base itself is of a laminate construction and includes a rigid, high strength forwardly facing wall and a layer of relatively soft foam adhered to the back surface of the wall. Handles are provided to enable the shield to be held on one arm across the front of one's torso.

14 Claims, 3 Drawing Sheets

PROCESS FOR MANUFACTURING AN HERALDIC ESCUTCHEON

BACKGROUND OF THE INVENTION

This invention relates generally to heraldic shields and a process for manufacturing ornamental or toy shields. More particularly, the present invention relates to a process for manufacturing a personalized heraldic escutcheon.

As used herein, an "escutcheon" refers to a shield or shield-shaped surface on which a coat of arms or a family name crest is displayed. A coat-of-arms is a group of emblems and figures (heraldic bearings) usually arranged on a shield and serving as the special insignia of some name, person, family or institution. Traditionally, the shield was used as protective armor carried in the hand or worn on a warrior's forearm during battle to fend off, for example, sword attacks. The coat-of-arms identified the warrior.

Although battle by sword is uncommon these days, a shield is often used by children and by adults during simulated war games. Jousting is becoming a popular pastime for enthusiasts and entertainers. In fact, there has been a resurgence of war games with a medieval theme, such as Dungeons and Dragons. Many video games also include medieval characters such as knights and maidens. Moreover, medieval themes are quickly becoming popular for dinner theaters, hotels, fairs, books and movies.

This interest has spawned or been part of a renewed sense of pride and curiosity into one's heritage. Parents and grandparents aim to instill a knowledge of their family heritage and genealogy into their children. A shield with a family's coat-of-arms appeals to parents and grandparents as it serves this purpose yet it also appeals to the child as it can be used in interactive play. The shield can also be used for decorative, ornamental purposes.

Many family surnames, especially those of European origin, have a known, distinctive coat-of-arms. Moreover, most family surnames for which a known coat-of-arms does not exist can be easily broken down into components represented by known heraldic bearings, which can then be arranged in a traditional manner to create a representative coat-of-arms. Access to one's coat-of-arms, and especially for those having surnames for which a traditional coat-of-arms does not exist, has, however, been quite limited. Thus the ability to create a personalized heraldic escutcheon has been severely limited through, primarily, a lack of a convenient mechanism for assembling heraldic bearings in a traditional format.

Accordingly, there has been a need for a novel process for accumulating emblems, figures and coats-of-arms in a manner which can be easily accessed for purposes of retrieving a known coat-of-arms or creating a coat-of-arms utilizing portions of a family surname and related heraldic variants. Such a process lends itself well to a process for manufacturing personalized heraldic escutcheons without specific knowledge of a family's coat-of-arms in advance. Additionally, there is a need for an efficient process to manufacture personalized heraldic escutcheons which are attractive and durable, and which may be used for ornamental purposes. Further, a need exists for personalized heraldic escutcheons manufactured to provide a toy which appeals to both children and adults. Such toy shields, in addition to being durable, should be comfortable to carry, safe to use, and provide some protection to the coat-of-arms which would minimize degradation of the image during use. The present invention fulfills these needs and provides other related advantages.

SUMMARY OF THE INVENTION

The present invention resides in a process for manufacturing personalized heraldic escutcheons. The novel process comprises, generally, the steps of accessing a suitable computer which stores and assembles heraldic emblems and figures into a coat-of-arms, inputting a family name, retrieving and transferring the coat-of-arms corresponding to the family name to a printer, printing the coat-of-arms onto an adhesive backed substrate, adhering the coat-of-arms bearing substrate to a base shaped like a shield, and adhering a protective cover over the coat-of-arms. Edging is then applied around the perimeter of the shield for improved durability and appearance.

In a preferred form of the invention, the base is shaped like a traditional medieval shield and has a rounded front surface on which the coat-of-arms is to be displayed. The base includes a rigid, forwardly-facing thin wall which supports the coat-of-arms bearing substrate, and a layer of soft foam adhered to a back surface of the forwardly-facing wall. A smaller piece of foam having a pair of die-cut foam arm straps is adhered to the back surface of the foam backing, to provide means for holding the shield.

The adhesive backed substrate is printer capable and may be, for example, flexible white vinyl or gloss paper. After the coat-of-arms has been printed onto the substrate, it is cut to conform to the shape of the base. The adhesive is then exposed, and the adhesive backing of the substrate is adhered directly to the front surface of the forwardly facing wall of the base.

The protective cover is formed of a transparent material and is dimensioned to conform to the shape of the front surface of the base. The cover has an adhesive backing and is adhered over the base in a manner covering the coat-of-arms to provide a protective overlay which minimizes scratching and other damage to the coat-of-arms.

The edging comprises a plurality of channel-like sections which cooperatively capture the edges of the base, the substrate, and the protective cover. When secured around the perimeter of the shield, the edging helps to ensure that the components of the shield remain assembled in use and protects such components from damage. The edging is secured about the perimeter in any suitable manner, for example by gluing or press fitting it into place.

Other features and advantages of the present invention will become apparent from the following more detailed description, taken in conjunction with the accompanying drawings which illustrate, by way of the principles of the invention. example,

BRIEF DESCRIPTION OF THE DRAWINGS

The accompanying drawings illustrate the invention. In such drawings.

DETAILED DESCRIPTION OF THE PREFERRED EMBODIMENT

Figure 1:
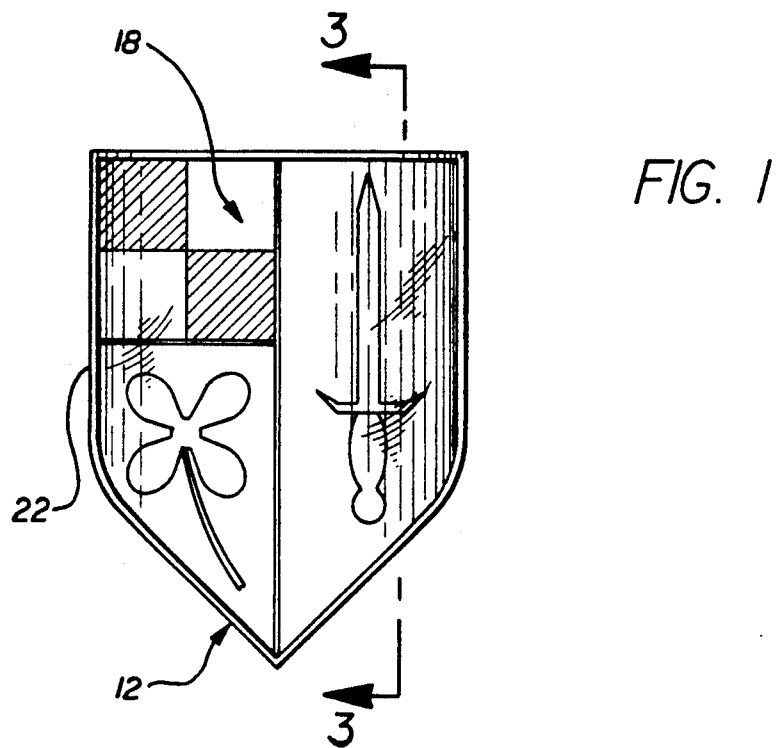
FIG. 1 is a front elevational view of a personalized heraldic escutcheon manufactured in accordance with the process of the present invention, illustrating an exemplary coat-of-arms on the front surface of a shield base.
Figure 2:
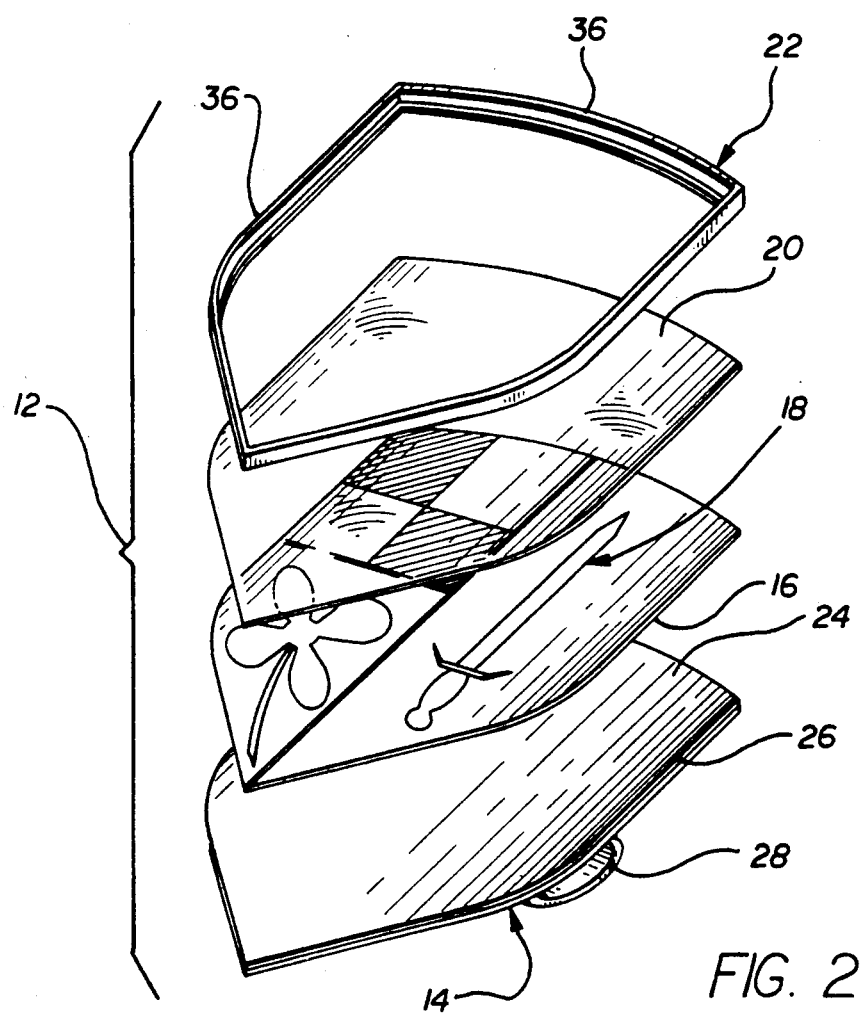
FIG. 2 is an exploded front, bottom and right side perspective view of the heraldic escutcheon shown in FIG. 1, illustrating the manner in which a coat-of-arms bearing substrate is applied to a front surface of the base, then overlaid with a transparent protective covering, following which the shield assembly is completed by application of edging around the perimeter of the shield.
Figure 3:
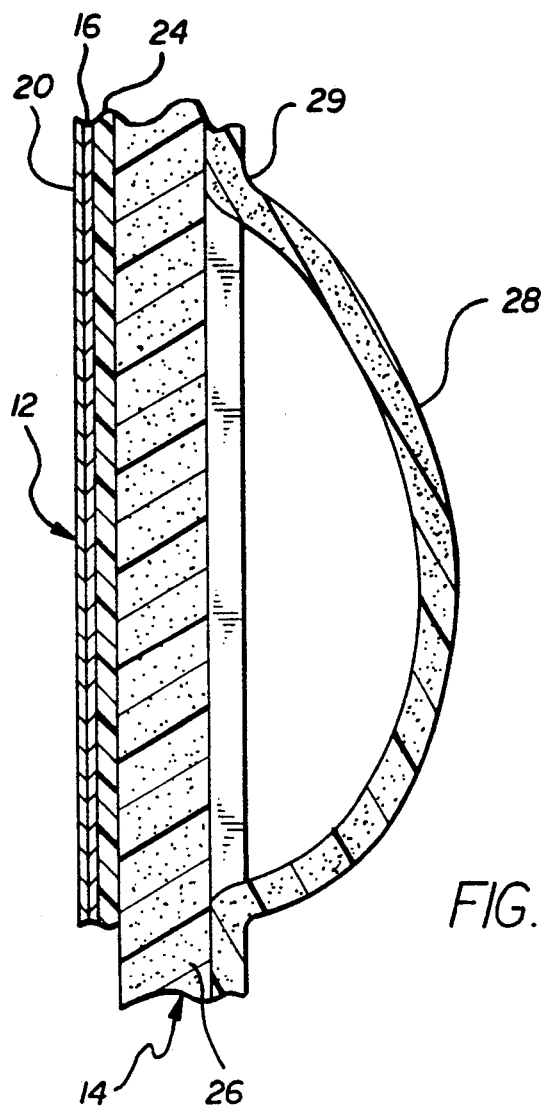
FIG. 3 is an enlarged, fragmented sectional view taken generally along the line 3—3 of FIG. 1.
Figure 4:
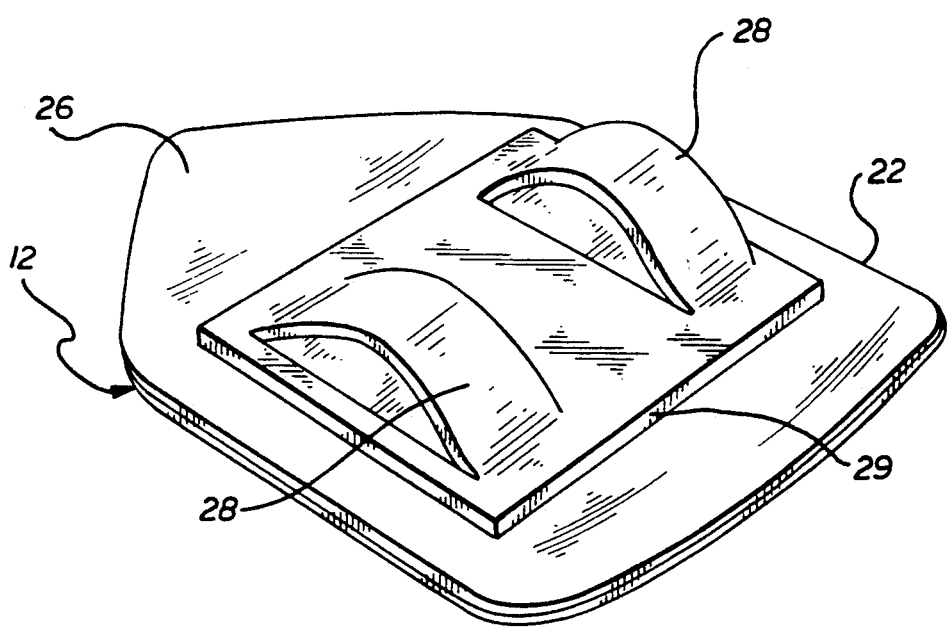
FIG. 4 is a rear perspective view of the personalized heraldic escutcheon shown in FIG. 1.
Figure 5:
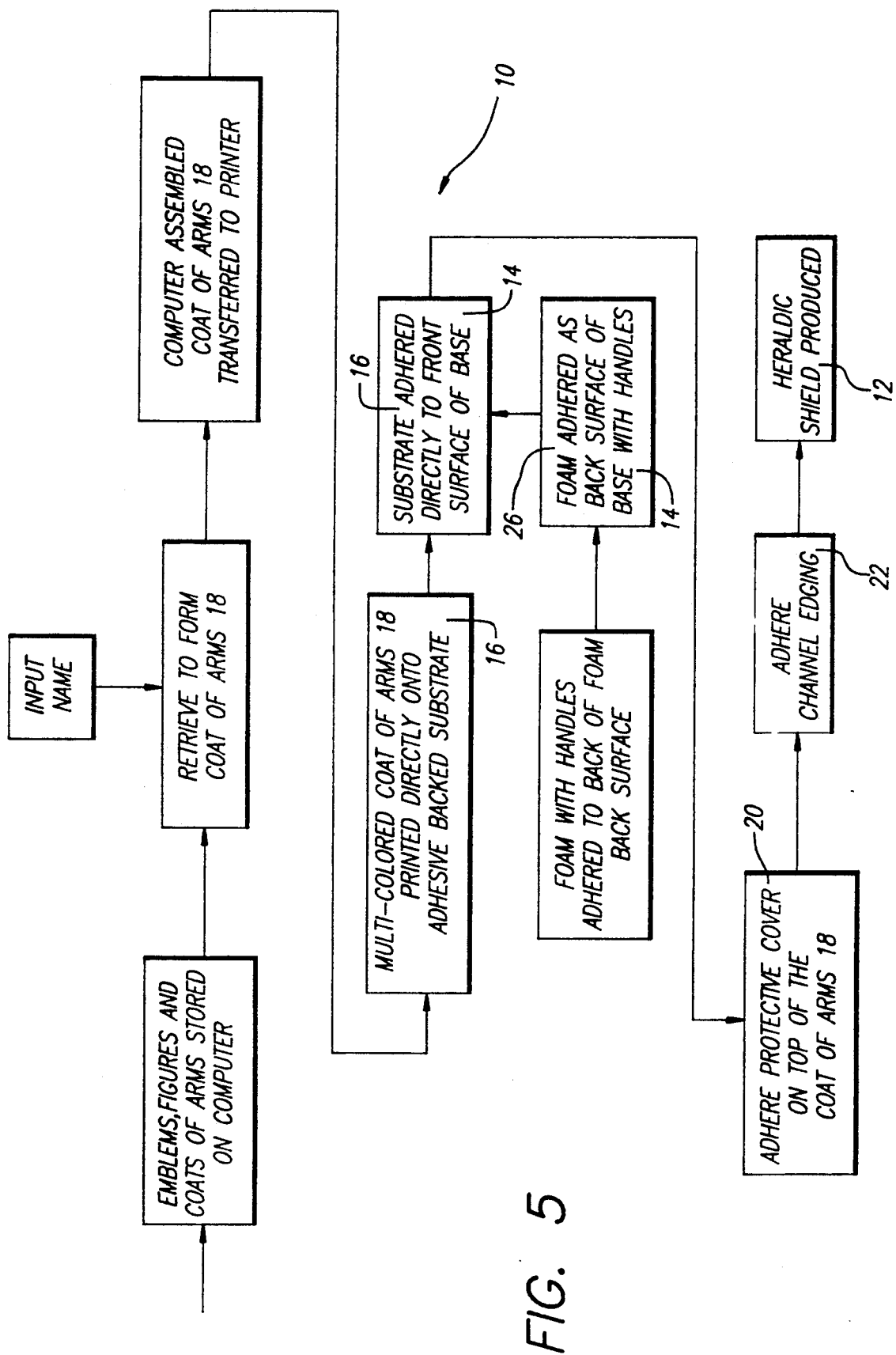
FIG. 5 is a flow diagram illustrating the process steps of the present invention utilized to manufacture the heraldic escutcheon shown in FIGS. 1-4.

As shown in the drawings for purposes of illustration, the present invention relates to a process for producing personalized heraldic escutcheons or shields, which process is generally designated in FIG. 5 by the reference number 10. The manufacturing process 10 comprises, generally, the steps of accessing a suitable computer which stores and assembles heraldic emblems and figures into a coat-of-arms, inputting a family name, retrieving and transferring the coat-of-arms corresponding to the family name to a color printer, printing the coat-of-arms onto an adhesive backed substrate, adhering the coat-of-arms bearing substrate to a base shaped like a shield, and adhering a protective cover over the coat-of-arms. Edging is then applied around the perimeter of the shield for improved durability and appearance.

In accordance with the present invention, and with reference to FIGS. 1-4, a shield 12 manufactured in accordance with the process 10 comprises, generally, a base 14 which is shaped like a traditional medieval shield, an adhesive-backed substrate 16 having a coat-of-arms 18 of heraldic emblems and figures printed thereon which overlies the base 14, a protective cover 20 which overlies the coat-of-arms, and edging 22 which is secured around the perimeter of the shield 12.

The base 14 includes a rigid, forwardly-facing thin wall 24 having a rounded front surface which supports the coat-of-arms bearing substrate 16, and a layer of soft foam 26 adhered to the back surface of the wall 24. The forwardly-facing wall 24 of the base 14 is preferably formed of molded ABS, high impact styrene or semi-rigid vinyl foam that has been cut to shape. The foam layer 26 preferably comprises a soft neoprene, cross-linked polyethylene or cross-linked copolymer foam. An adhesive is provided between the back surface of the forwardly facing wall 24 and the front surface of the layer of foam 26, to adhere the foam to the wall. The wall 24 and the foam 26 provide the primary structure for the base 14.

The base 14 also includes a pair of handles 28 which, in the illustrated embodiment, permit a user to hold the shield 12 on one arm across the front of the user's torso. As shown best in FIGS. 3 and 4, the handles 28 are die-cut into a square piece of foam 29. The foam is adhered to the back surface of the foam layer 26. This particular construction of the base 14 provides a strong yet lightweight and comfortable shield base which can be safely used by a child.

The adhesive-backed substrate 16 having the coat-of-arms 18 printed on a front surface thereof is adhered to the front surface of the base wall 24. The substrate 16 is preferably cut to conform to the shape of the base. The substrate 16 has a peel-off backing which covers the entire back surface thereof, and specifically the substrate adhesive. The peel-off backing is removed from the substrate 16 just before the substrate's affixation to the front surface of the base 14. The adhesive-backed substrate 11 is printer capable and preferably comprises a flexible white vinyl or gloss paper.

The printer utilized to print the coat-of-arms 18 onto the substrate 16 may be, for example, a Textronix Model No. Phaser III printer. The printed coat-of-arms 18 usually identifies one's family and is either stored in a computer or is assembled by the computer from components of the family name. For example, if no known coat-of-arms exists for the family name "Woodman" heraldic emblems or figures representing "wood" and "man" are assembled to produce the coat-of-arms.

The protective cover 20 has an adhesive backing similar to that provided the substrate 16. Again, a peel-off backing is removed prior to adhering the cover 20 over the coat-of-arms 18. The outer dimensions of the cover 20 are made to conform closely with the outer dimensions of the base 14. In this manner, the cover 20 can be fixed to the front surface of the base 14 to give the appearance of an integral unit. The cover 20 is preferably constructed of a flexible, transparent material, for example vinyl, that can be readily contourable to the base 14. Moreover, it should resist wrinkling once the adhesive backing is removed. When the cover 20 is adhered over the base 14, a laminated protective surface is provided over the substrate 16 through which the coat of arms 18 is visible.

The edging 22 comprises a plurality of channel-like sections 36 which cooperatively capture the edges of the base 14, the substrate 16, and the protective cover 20. The edging 22 is constructed of moderately flexible yet sturdy extruded PVC or ABS polystyrene material conforming in shape to the perimeter of the shield 12. The channel sections 36 are either glued or press fit about the perimeter of the shield 12, to provide the shield additional strength and maintain the components thereof in an assembled condition. Moreover, the edging 22 helps to protect the shield from damage which can occur during rough handling.

With reference now to FIG. 6, the process 10 for manufacturing a personalized heraldic escutcheon will be described in greater detail. First, a suitable computer is utilized to store emblems, figures and coats-of-arms. As mentioned previously, coats-of-arms may be stored per se within the computer for selected names, which may be retrieved on command. Other emblems and figures (heraldic bearings) are also stored for common name components. A family name then provides input to the computer which retrieves either a known coat-of-arms for the family name, or assembles emblems and figures into a traditional format to create a coat-of-arms. Computer assembled coat-of-arms data is then transferred to the printer.

The printer, which is preferably capable of producing multi-color coats-of-arms, utilizes the data provided by the computer to print the assembled coat-of-arms onto the front surface of the adhesive backed substrate 16. The substrate 16 is removed from the printer, the peel off backing is removed from the adhesive, and then the substrate 16 is adhered directly onto the front surface of the base 14, and specifically over the rounded forwardly facing wall 24. Prior to adhering the substrate 16 to the wall 24, the foam 29 having the pair of die-cut handles 28, the foam layer 26 and wall 24 have been previously assembled to one another as described above.

The protective vinyl cover 20 is then adhered over the substrate 16 to provide a measure of protection to the printed coat-of-arms 18, and then the channel sections 36 are secured about the periphery of the shield 12. The result is a personalized heraldic escutcheon which can be produced economically, is very durable, and has a pleasing appearance.

The shield 12 may also be assembled from a kit. An instruction sheet and a pattern are provided in the kit identifying where the various components of the coat-of-arms 18 are to be adhered to the base 14. The components are cut from the adhesive-backed substrate 16 before adhering them to the base 14. The remaining process steps are identical to those above described.

Although a particular embodiment of the invention has been described in detail for purposes of illustration, various modifications may be made without departing from the spirit and scope of the invention. Accordingly, the invention is not to be limited, except as by the appended claims.

I claim:

1. A process for manufacturing a personalized heraldic shield, comprising:
   accessing a computer which stores heraldic coats-of-arms;
   inputting a family name;
   retrieving a coat-of-arms corresponding to said family name from the computer and transferring said coat-of-arms to a printer for printing onto a front surface of a flexible substrate; and
   adhering said substrate onto a front surface of a base having a shield-like shape.

2. The process of claim 1, including the step of providing a base having a rigid, forwardly-facing thin wall for supporting the coat-of-arms bearing substrate, and a layer of soft foam adhered to a back surface of the forwardly-facing wall.

3. The process of claim 2, wherein the forwardly facing wall is molded of ABS, high-impact styrene or semi-rigid vinyl foam to have a rounded configuration.

4. The process of claim 2, wherein the base includes handle means for holding said shield.

5. The process of claim 1, wherein said substrate comprises adhesive-backed vinyl, and said protective cover comprises an adhesive backed transparent vinyl.

6. The process of claim 1, including the step of applying edging around the perimeter of the shield to ensure that the components of the shield remain assembled in use.

7. The process of claim 6, including the step of providing edging comprised of a plurality of channel-like sections which cooperatively capture the edges of the shield defining the shield perimeter.

8. A process for manufacturing a personalized heraldic shield, comprising:
   accessing a computer which stores heraldic coats-of-arms;
   inputting a selected family name;
   retrieving a coat-of-arms corresponding to said name from the computer and transferring said coat-of-arms to a printer for printing onto a front surface of a printer capable adhesive-backed flexible substrate; and
   adhering said substrate bearing said coat-of-arms to a front surface of a base to display said coat-of-arms thereon.

9. The manufacturing process of claim 8, including the step of providing a base having a rigid, forwardly-facing thin wall for supporting the coat-of-arms bearing substrate, and a layer of soft foam adhered to a back surface of the forwardly-facing wall.

10. The manufacturing process of claim 9, wherein the forwardly-facing wall is molded to have a rounded configuration.

11. The manufacturing process of claim 8, including the step of providing edging comprised of a plurality of channel-like sections which cooperatively capture the edges of the shield defining the shield perimeter.

12. The manufacturing process of claim 8, wherein the base includes handle means for holding said shield.

13. A manufacturing process of claim 8, including the step of adhering a protective, adhesive-backed transparent vinyl cover over the substrate bearing said coat-of-arms, prior to the step of adhering flexible channel edging around the perimeter of the shield.

14. A process for manufacturing a personalized heraldic shield, comprising:
   accessing a computer hitch stores heraldic coats-of-arms;
   inputting a family name;
   retrieving a coat-of-arms corresponding to said family name from the computer and transferring said coat-of-arms to a color printer for color printing onto a front surface of a flexible substrate;
   adhering said substrate onto a front surface of a base having a shield-like shape; and
   adhering a transparent protective cover over said substrate.

* * * * *

UNITED STATES PATENT AND TRADEMARK OFFICE
CERTIFICATE OF CORRECTION

PATENT NO. : 5,273,607
DATED : December 28, 1993
INVENTOR(S) : John B. O'Scanlon It is certified that error appears in the above-identified patent and that said Letters Patent is hereby corrected as shown below:

In column 2, line 58, after "of" insert --example,--.

In column 2, line 59, delete "example,".

In column 6, line 41, delete "hitch" and insert --which--.

Signed and Sealed this

Fifth Day of July, 1994

Attest:

BRUCE LEHMAN

Attesting Officer

Commissioner of Patents and Trademarks